United States Patent
Wilson

(10) Patent No.: US 11,619,477 B2
(45) Date of Patent: Apr. 4, 2023

(54) INSERT MOLDED METAL CASE PLATES

(71) Applicant: APEX BRANDS, INC., Apex, NC (US)

(72) Inventor: Cecil McKinley Wilson, Sanford, NC (US)

(73) Assignee: Apex Brands, Inc., Apex, NC (US)

(*) Notice: Subject to any disclaimer, the term of this patent is extended or adjusted under 35 U.S.C. 154(b) by 0 days.

(21) Appl. No.: 17/800,376

(22) PCT Filed: Mar. 3, 2021

(86) PCT No.: PCT/US2021/020648
§ 371 (c)(1),
(2) Date: Aug. 17, 2022

(87) PCT Pub. No.: WO2021/178521
PCT Pub. Date: Sep. 10, 2021

(65) Prior Publication Data
US 2023/0076469 A1    Mar. 9, 2023

Related U.S. Application Data

(60) Provisional application No. 62/985,130, filed on Mar. 4, 2020.

(51) Int. Cl.
*G01B 3/1043* (2020.01)
*G01B 3/1005* (2020.01)
(Continued)

(52) U.S. Cl.
CPC ......... *G01B 3/1043* (2020.01); *G01B 3/1005* (2013.01); *G01B 3/1056* (2013.01);
(Continued)

(58) Field of Classification Search
CPC .. G01B 3/1043; G01B 3/1005; G01B 3/1056; G01B 2003/1025; G01B 2003/1058
See application file for complete search history.

(56) References Cited

U.S. PATENT DOCUMENTS 2,013,322 A    9/1935   Volz
4,189,107 A    2/1980   Quenot et al.
(Continued)

OTHER PUBLICATIONS

International Search Report and Written Opinion of International Application No. PCT/US2021/020648 dated Jul. 8, 2021, all enclosed pages cited.

*Primary Examiner* — Yaritza Guadalupe-McCall
(74) *Attorney, Agent, or Firm* — Burr & Forman, LLP

(57) ABSTRACT

A tape measuring device includes a housing having a first case half, a second case half, and an aperture. The device also includes a reel assembly disposed in the housing, a tape having a first end operably coupled to an end hook and configured to extend from the housing through the aperture and having a second end configured to be wound on the reel assembly, and a retraction assembly configured to interface with the reel assembly to enable the tape, after extension from the housing, to be wound onto the reel assembly. The first case half includes a first metallic case plate operably coupled thereto without a fastener, and the second case half includes a second metallic case plate operably coupled thereto without a fastener. The first and second case halves may be operably coupled together via one or more fasteners operably coupling the first metallic case plate to the second metallic case plate.

14 Claims, 8 Drawing Sheets

(51) Int. Cl.
*G01B 3/1056* (2020.01)
*G01B 3/10* (2020.01)

(52) U.S. Cl.
CPC .............. *G01B 2003/1025* (2013.01); *G01B 2003/1058* (2013.01)

(56) References Cited

U.S. PATENT DOCUMENTS

| | | | |
|---|---|---|---|
| 5,400,520 A * | 3/1995 | Hillinger | G01B 3/1041 33/761 |
| 6,857,198 B1 | 2/2005 | Lin | |
| 8,793,890 B2 * | 8/2014 | Delneo | G01B 3/1041 33/769 |
| 11,402,192 B2 * | 8/2022 | Baxter | G01B 3/1043 |
| 2003/0233762 A1 | 12/2003 | Blackman et al. | |
| 2008/0196264 A1 | 8/2008 | McEwan et al. | |
| 2018/0065404 A1 * | 3/2018 | Khangar | B44D 3/38 |
| 2021/0325159 A1 * | 10/2021 | Baxter | G01B 3/1056 |

* cited by examiner

INSERT MOLDED METAL CASE PLATES

TECHNICAL FIELD

Example embodiments generally relate to tape measuring devices, and more particularly relate to such a device having an injection molded housing with metallic case plates that improve device robustness without increasing the cost or complication of manufacture.

BACKGROUND

Tape measuring devices typically have a blade or tape (e.g., made of metal, fiberglass or other materials) that is wound onto a reel or reel assembly. An end hook is affixed to the distal end of the tape, and can be pulled, thereby extracting tape from the reel assembly, to place the end hook at a first point that is distant from a second point near which the remainder of the tool will be retained. Alternatively, the end hook could be affixed to the first point and the remainder of the tool can be moved to the second point while withdrawing tape from the reel assembly. In either case, the end hook retains the tape at the first point, and the user may make measurements, using markings provided on the tape, along a line between the first and second points. After measuring is complete, the user often operates a rotatable handle that is operably coupled to the reel assembly to retract the tape back onto the reel or drum thereof for longer tape measuring device (e.g., greater than 25 feet), or a spring loaded retraction assembly automatically retracts the tape back onto the reel.

The processes described above, and the tools adapted for performing the processes, are both very old. However, equally old in relation to these types of tools, is the fact that the conventional designs for the tools often have to either sacrifice robustness in favor of lowering cost and ease of manufacture, or if made robustly, such devices are expensive and complicated to manufacture. Thus, devices with improved designs and methods of manufacture that can avoid this common tradeoff may be of significant value both in terms of enabling high quality devices to be constructed, and also in terms of being able to do so at price points that will be attractive to consumers.

BRIEF SUMMARY OF SOME EXAMPLES

Some example embodiments may enable the provision of a tape measuring device that has an improved design, which enables metallic plates to be insert-molded into case halves. Accordingly, the disadvantages discussed above may be overcome.

In an example embodiment, a tape measuring device is provided. The tape measuring device may include a housing having a first case half, a second case half, and an aperture. The device may also include a reel assembly disposed in the housing, a tape having a first end operably coupled to an end hook and configured to extend from the housing through the aperture and having a second end configured to be wound on the reel assembly, and a retraction assembly configured to interface with the reel assembly to enable the tape, after extension from the housing, to be wound onto the reel assembly. The first case half includes a first metallic case plate operably coupled thereto without a fastener, and the second case half includes a second metallic case plate operably coupled thereto without a fastener. The first and second case halves may be operably coupled together via one or more fasteners operably coupling the first metallic case plate to the second metallic case plate.

In another example embodiment, method of making a tape measuring device may be provided. The method may include insert-molding a first case half with a first metallic case plate, insert-molding a second case half with a second metallic case plate, providing a reel assembly on which tape is wound between the first and second case halves, and joining the first and second case halves together by fastening the first metallic case plate to the second metallic case plate.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 7B:
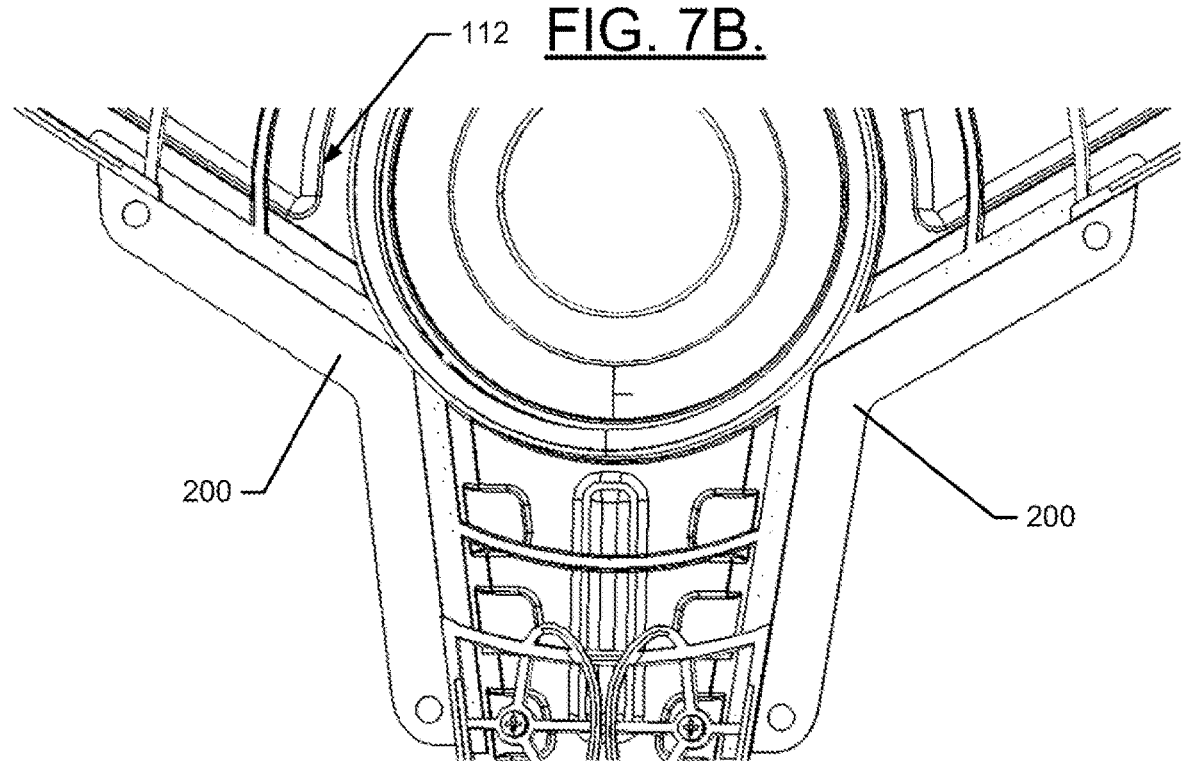
FIG. 7A is a front view of the first case half after insert-molding with the metallic case plates of an example embodiment.
Figure 7A:
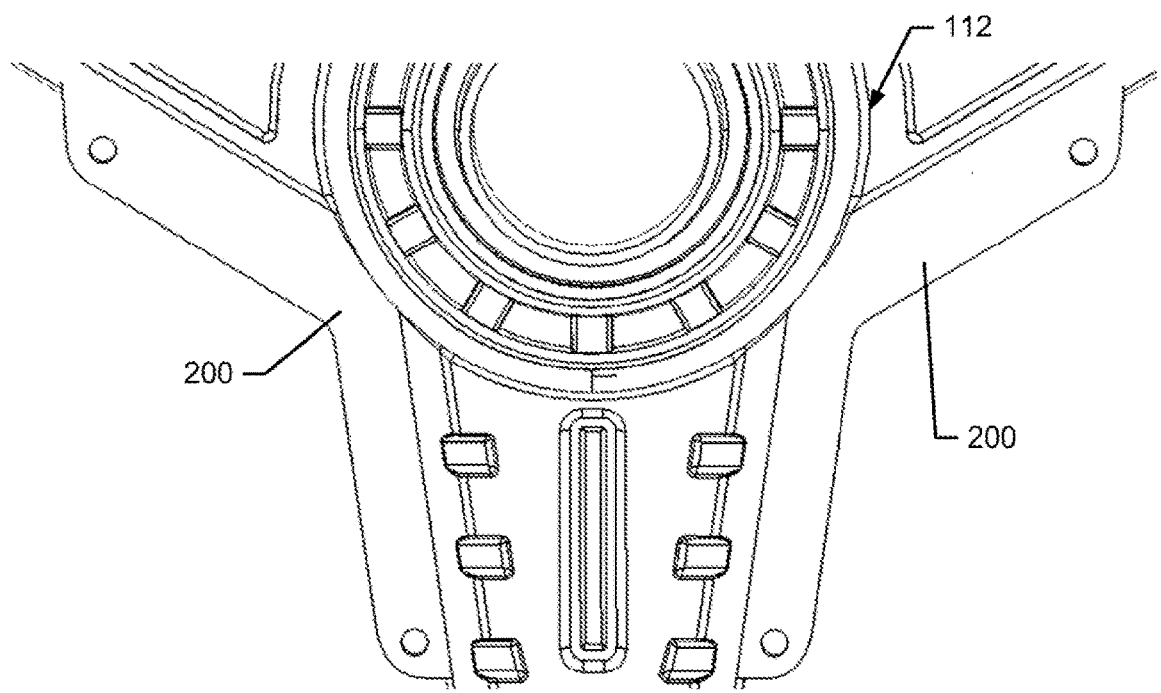
Figure 8:
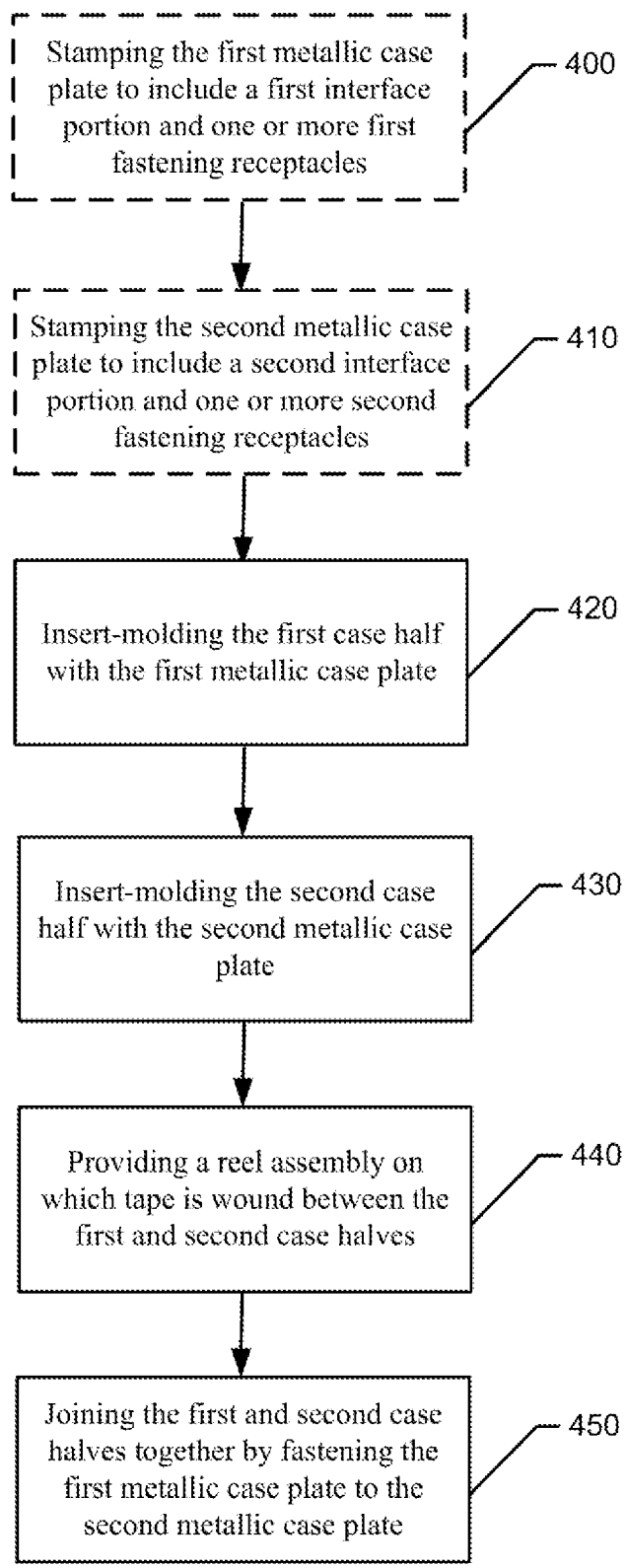

FIG. 7B a rear view of the first case half of FIG. 7A in accordance with an example embodiment; and FIG. 8 is a block diagram of a method of making a measuring tape device in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Figure 1:
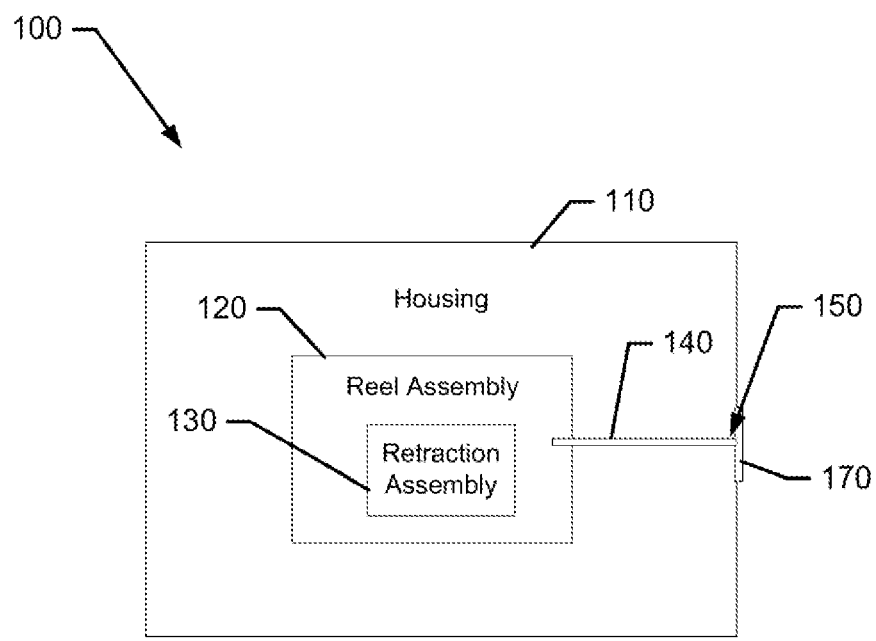
FIG. 1 illustrates a block diagram of a tape measuring device in accordance with an example embodiment.

As indicated above, some example embodiments may relate to the provision of a tape measuring device that may have an improved design for the case halves, which may improve both robustness and manufacturability of the device. This may also, and advantageously, be accomplished using a design that employs insert-molded metal plates to improve, but also simplify the design and reduce costs associated therewith. FIG. 1 illustrates a block diagram of a tape measuring device 100 in accordance with an example embodiment, and FIGS. 2 and 3 illustrate front and rear views, respectively, of the tape measuring device 100.

Figure 2:
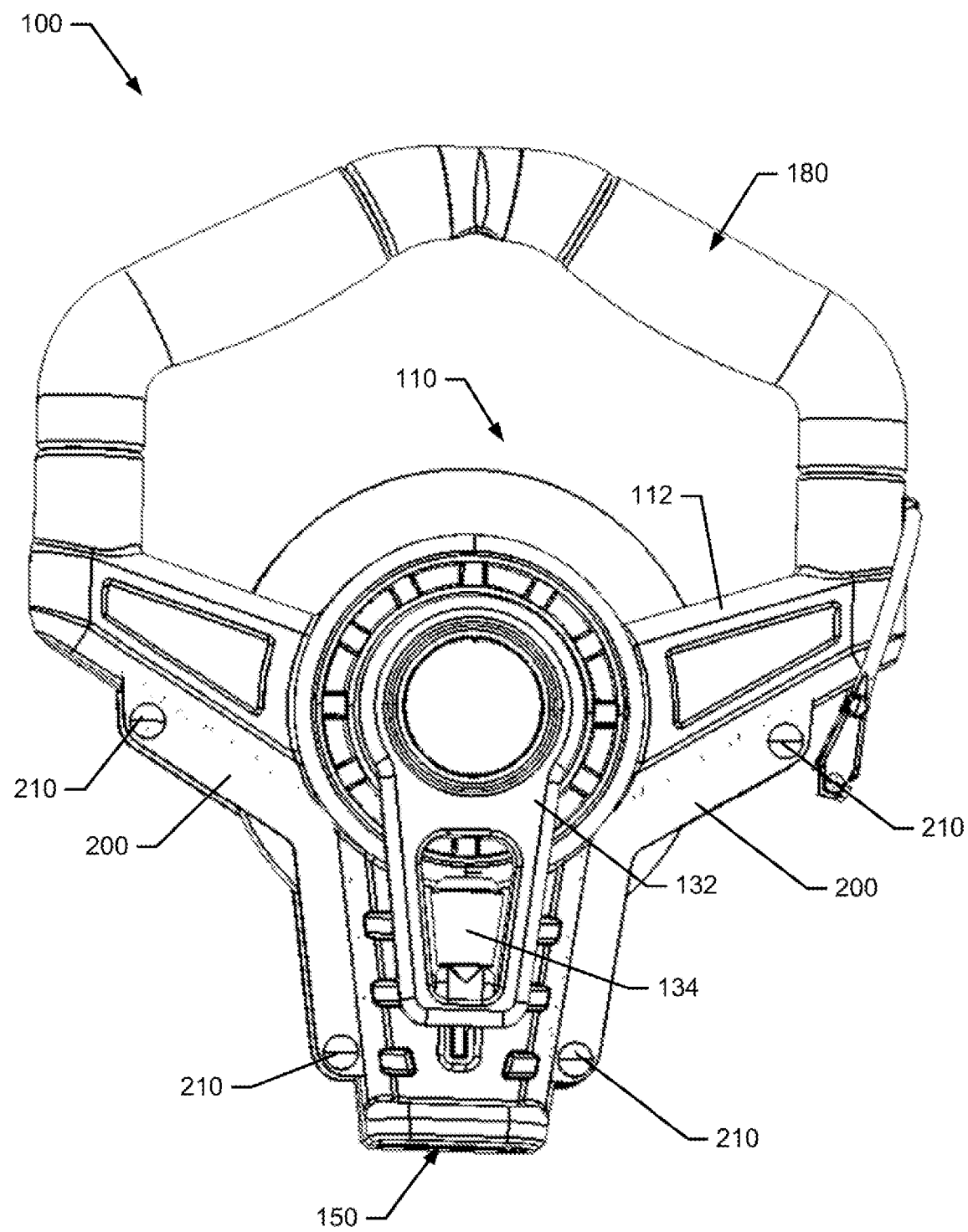
FIG. 2 illustrates a front view of the tape measuring device in accordance with an example embodiment.
Figure 3:
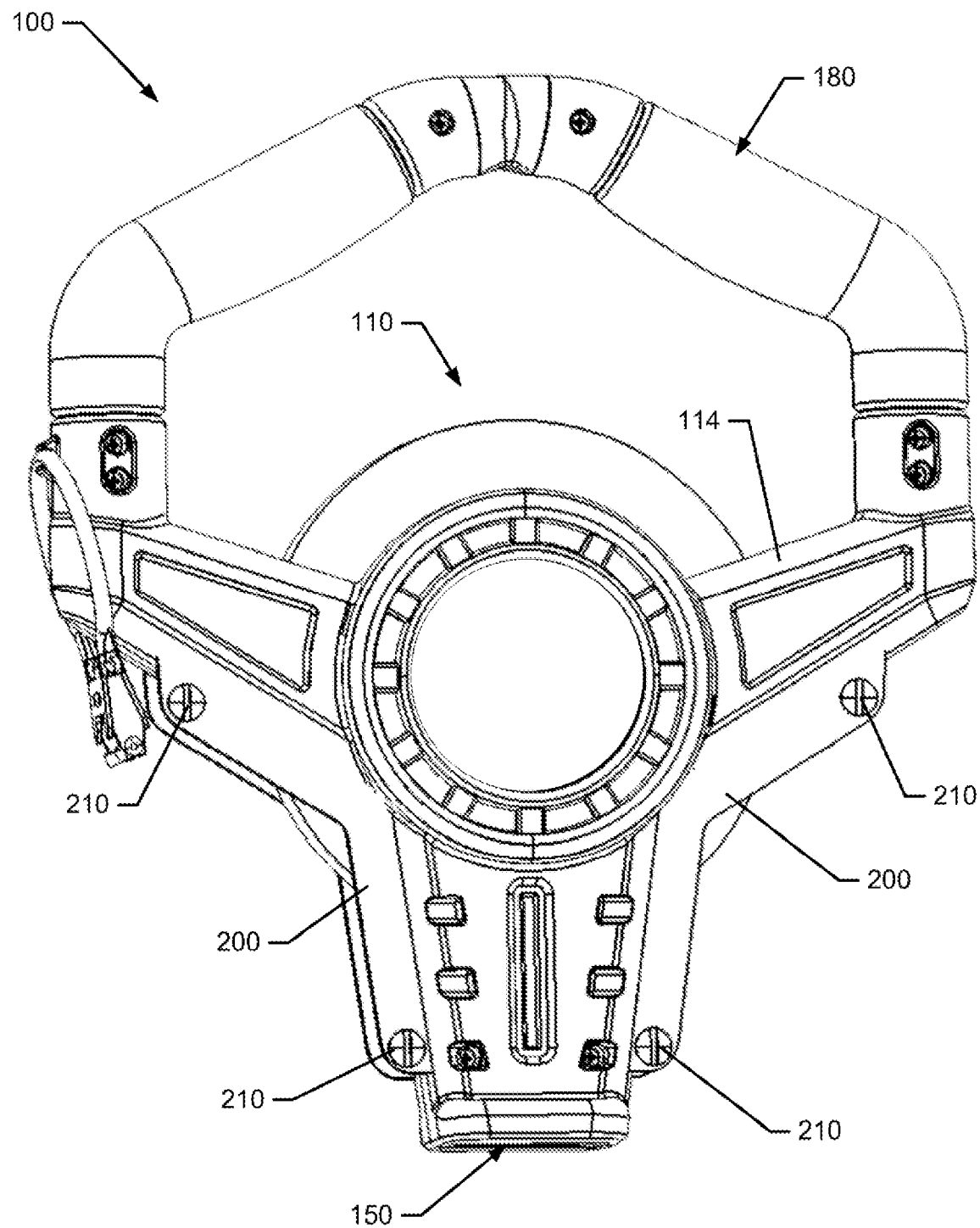
FIG. 3 illustrates a rear view of the tape measuring device in accordance with an example embodiment.

Referring now to FIGS. 1-3, the tape measuring device 100 of an example embodiment may include a housing 110 comprising a first case half 112 and a second case half 114. The first and second case halves 112 and 114 may be made from a moldable material (e.g., resin, plastic, and/or the like) that can be employed for insert-molding as described herein. In some cases, the material may be a thermoplastic elastomer (TPE), but other materials are also possible. The first and second case halves 112 and 114 may house a reel assembly 120 and a retraction assembly 130 therein. In some cases, the housing 110 may only include the first and second case halves 112 and 114, and the first and second case halves 112 and 114 may each be a single unitary structure. However, in other cases, the first and second case halves 112 and 114 may include or otherwise interface with a separate reel cover that may be shaped to encase the reel assembly 120, and which may be positioned (e.g., in two parts) between the first and second case halves 112 and 114.

A tape 140 may be wound onto the reel assembly 120 and may be alternately withdrawn from and retracted back onto the reel assembly 120. The retraction back onto the reel assembly 120 may be accomplished via the retraction assembly 130, which may include a crank 132 and a foldable knob 134 that is folded in to nest inside a portion of the crank 132 proximate to the first case half 112, and folded out in order to enable the user to turn the crank 132 about an axis of the reel assembly 120. When the knob 134 is folded out and turned, the reel assembly 120 may be configured to rotate either once for each rotation of the crank 132, or multiple times (dependent upon the configuration of the retraction assembly 130). In this regard, in some cases, the retraction assembly 130 may include a hub that is operably coupled to the crank 132, and that rotates and is operably coupled to a gear assembly that may provide multiple rotations of a drum or reel of the reel assembly 120 for each respective rotation of the knob 134 and the crank 132.

The tape 140 may be paid out through an aperture 150 formed in a portion of the housing 110. The aperture 150 may be formed to be slightly larger than a diameter of the tape 140. The tape 140 may therefore be retained on the reel assembly 120 before passing out the aperture 150. The tape 140 may also include an end hook 170 disposed at one end thereof, and the tape 140 is affixed to the reel assembly 120 at the other end of the tape 140. The end hook 170 may be affixed (temporarily) to an anchor point on a medium or surface that is to be marked. Once the end hook 170 is affixed to the anchor point, the tape 140 may be paid out of the aperture 150 and unwound from the reel assembly 120. When a desired length of the tape 140 has been paid out, the user can make any necessary measurements using the tape 140 as described above. The end hook 170 may then be released from the anchor point, and the crank 132 and knob 134 may be used to operate the retraction assembly 130 to wind the tape 140 back onto the reel assembly 120 by drawing the tape 140 back into the housing 110 via the aperture 150. In this regard, the knob 134 may be rotated from the position show in FIGS. 2 and 3 to an extended position and then force applied to the knob 134 may turn the crank 132, the hub and the reel assembly 120 to draw the tape 140 onto the reel assembly 120.

The tape measuring device 100 of FIGS. 1-3 happens to be a long tape measuring device (e.g., having a length greater than 25 feet). Thus, the tape 140 is flat and non-metallic, and the tape 140 is not automatically retracted onto the reel assembly 120 via a version of the retraction assembly 130 that is automated. However, example embodiments could also be employed on devices with automated versions of the retraction assembly 130. In such a case, the retraction assembly 130 would not need to include the crank 132 or the knob 134, but would instead include an internally located spring assembly to provide automation of the retraction function.

In some cases, the tape measuring device 100 may also include a handle 180, which may be operably coupled to the housing 110 or which may be integrally formed as part of the first and second case halves 112 and 114. Thus, for example, the handle 180 may have two halves, and each of the halves may be formed by injection molding along with the first and second case halves 112 and 114, respectively. In this regard, the first case half 112 may be injection molded as a single unitary structure (with or without its respective portion of the handle 180), and the second case half 114 may be injection molded as a single unitary structure (with or without its respective portion of the handle 180) separate from the first case half 112. The first and second case halves 112 and 114 may then be affixed together around the remaining (internal) components of the tape measuring device 100 that are mentioned above.

Figure 4:
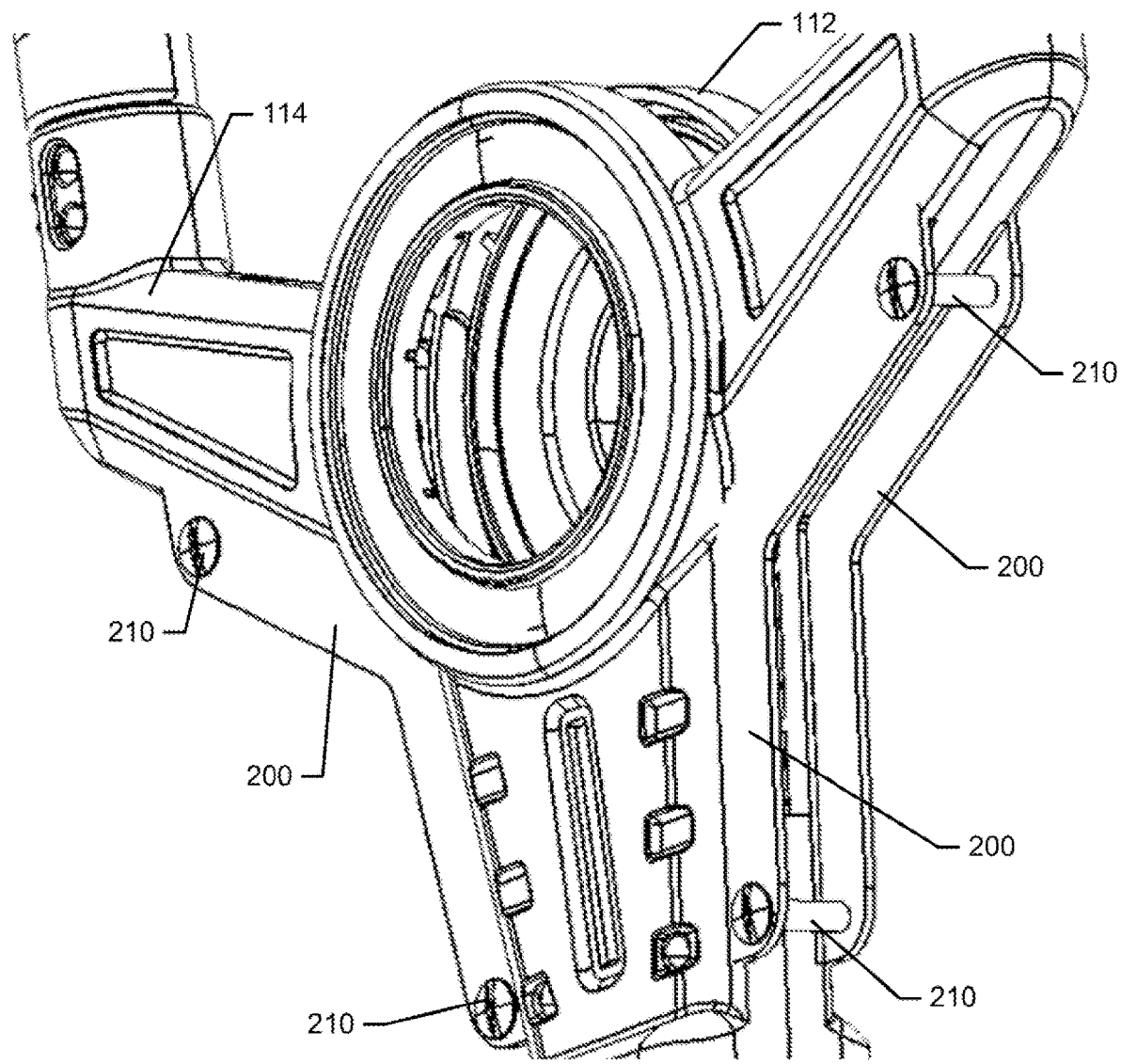
FIG. 4 shows a perspective view of the first and second case halves with the metallic case plates and their relationships with one another shown in greater detail in accordance with an example embodiment.

For conventional measuring tape devices, the first and second case halves 112 and 114 would be affixed together by metallic screws that interact directly with the non-metallic and molded portions of the first and second case halves 112 and 114, respectively. While generally effective, this design and method of construction is vulnerable to failure at the interface between the screws and the molded portions of the first and second case halves 112 and 114. In this regard, for example, the screws may strip the screw bosses, or the screw bosses may break. To address this issue, example embodiments further employ metallic case plates 200 shown in FIGS. 2-4. In this regard, FIG. 4 shows a perspective view of the first and second case halves 112 and 114 with the metallic case plates 200 and their relationships with one another in greater detail.

As will be discussed in greater detail below, the metallic case plates 200 may be insert-molded into each of the first and second case halves 112 and 114. Metallic fasteners 210 used to hold the first and second case halves 112 and 114 together may then interface directly with the metallic case plates 200 (and not with the molded materials of the first and second case halves 112 and 114). As shown in FIG. 4, the fasteners 210 do not touch any part of the first and second case halves 112 and 114, and instead only touch and interface with the metallic case plates 200. The fasteners 210 (and the parts of the first and second case halves 112 and 114 that interface directly with them) are therefore no longer a weak point in the design. To the contrary, as will be discussed in greater detail below, the location of the fasteners 210 in this way, and the formation of the metallic case plates 200 in the first and second case halves 112 and 114 in this fashion, result in both an improved manufacturability and a more robust design.

Figure 5:
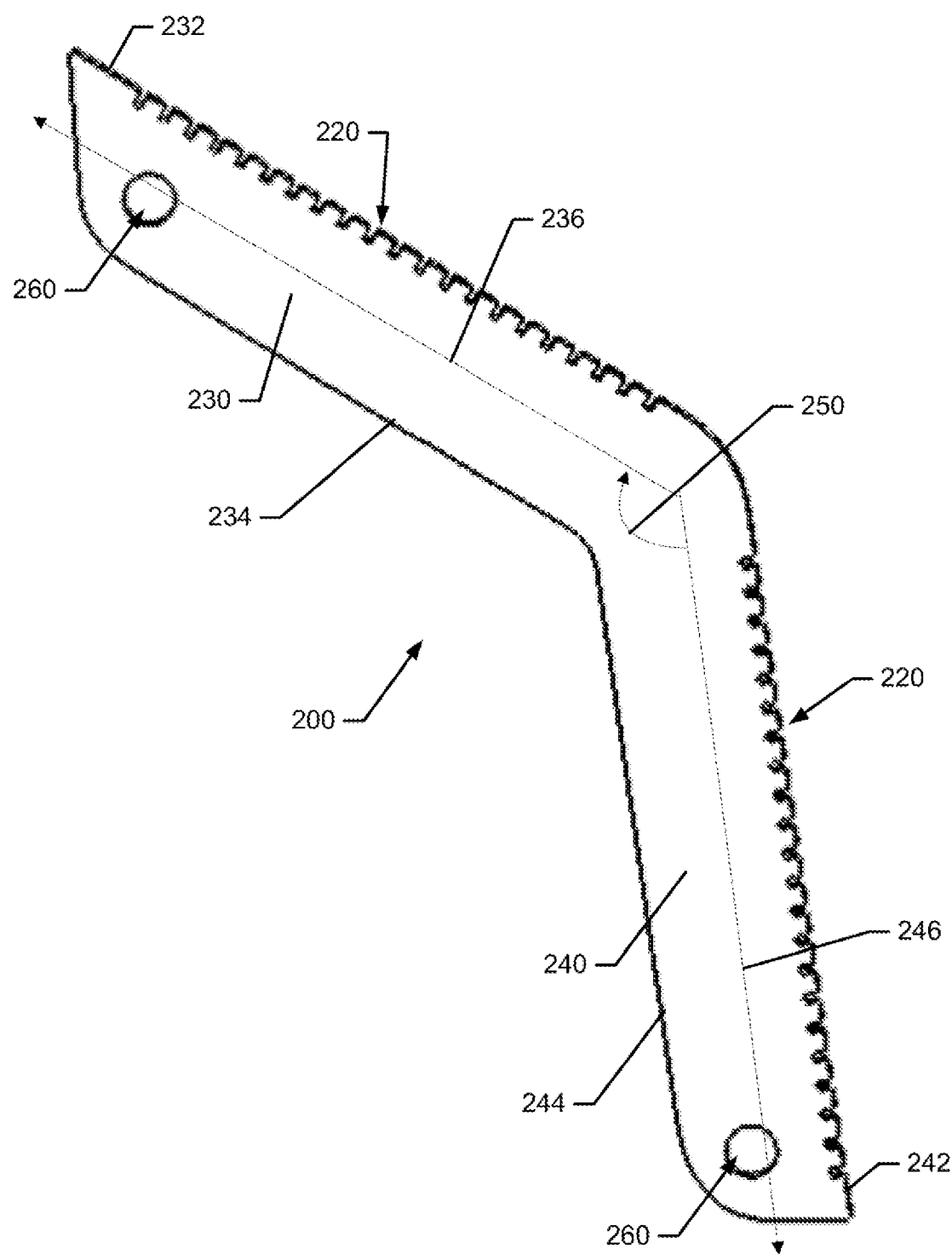
FIG. 5 illustrates a front view of one of the metallic case plates in isolation in accordance with an example embodiment.

In an example embodiment, the metallic case plates 200 may initially be formed, and then the metallic case plates 200 may be positioned for insert-molding with the first and second case halves 112 and 114. FIG. 5 illustrates one of the metallic case plates 200 in isolation. The metallic case plates 200 may be formed via any of a number of methods (e.g., laser cutting, machining, etc.). However, in accordance with an example embodiment, the metallic case plates 200 may be stamped from sheet metal. Stamping may be a relatively low cost and simple method for making the metallic case plates 200, and may provide the engagement features described below that facilitate a resultant assembly including one of the case halves (e.g., one of either the first case half 112 or the second case half 114) and at least one instance (and in this case two instances) of the metallic case plate 200.

As shown in FIG. 5, the metallic case plate 200 an interface portion 220 that is defined by a plurality of stamped features (e.g., teeth, fingers, cutouts, projections, or the like) that are provided along at least one side of the metallic case plate 200. In this example, the metallic case plate 200 has the interface portion 220 provided along two sides thereof. In this regard, the metallic case plate 200 is a metallic plate or sheet that has been cut to include a first portion 230 having a first proximal edge 232 and a first distal edge 234 positioned opposite the first proximal edge 232. The first proximal edge 232 and the first distal edge 234 each extend substantially parallel to each other in a first direction 236. The terms "proximal" and "distal" within this context refer to proximity to the first or second case halves 112 or 114.

The metallic plate or sheet of the metallic case plate 200 has also been cut to include a second portion 240 having a second proximal edge 242 and a second distal edge 244 positioned opposite the second proximal edge 242. The second proximal edge 242 and the second distal edge 244 each extend substantially parallel to each other in a second direction 246. An angle 250 is defined between the first direction 236 and the second direction 246. In some cases, the angle 250 may be between 90 degrees and 160 degrees. However, the choice for the size of the angle 250 may depend on various design considerations, and is generally selectable based on those design considerations. Moreover, some embodiments may not include the angle 250 at all, and therefore there may not be distinct first and second portions 230 and 240. Instead, only one proximal edge and one distal edge, with only the proximal edge including the interface portion 220 may be included in some alternative embodiments.

During stamping, fastener receptacles 260 may also be formed in the metallic case plate 200. At least one fastener receptacle 260 may be provided proximate to each longitudinal end of the metallic case plate 200. In this example, since there are two distinct portions (i.e., the first portion 230 and the second portion 240), one instance of the fastener receptacle 260 is provided at a distal end of each of the first and second portions 230 and 240. The term "distal" in this context is meant to be considered relative to the point at which the first and second portions 230 and 240 diverge from each other.

Figure 6:
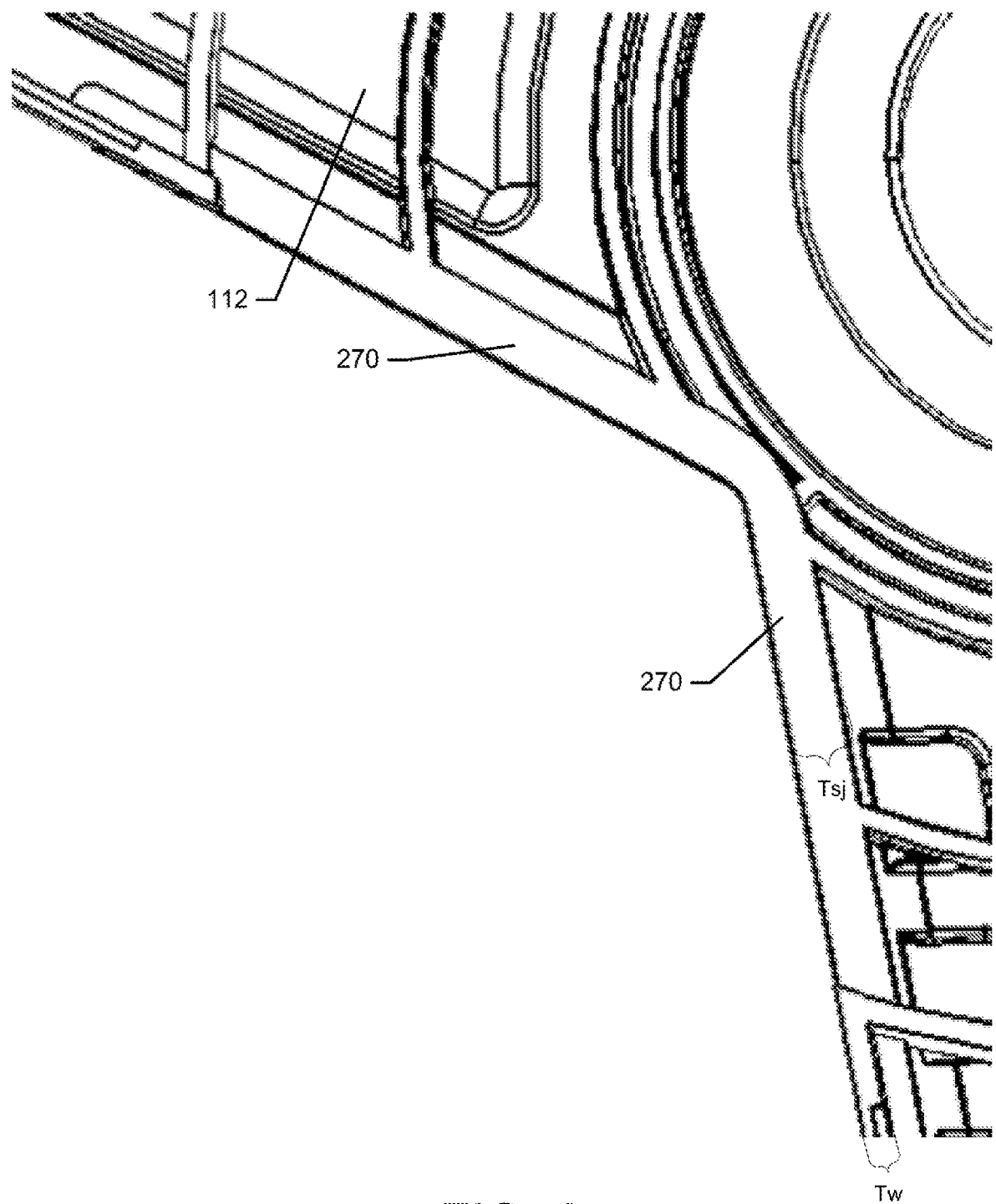
FIG. 6 is a rear view of a portion of the first case half in accordance with an example embodiment.

The stamped features of the interface portion 220 may, during the insert-molding process, have the molding material of the first case half 112 or second case half 114 (e.g., resin, TPE, etc.) extend therein and fill any spaces therebetween. Thus, for example, the teeth, fingers, projections, etc. of the interface portion 220 may become interlocked with the molding material of the first case half 112 or second case half 114 to form a relatively strong bond therebetween. Moreover, as shown in FIG. 6, which shows a portion of the first case half 112 in isolation, an increased wall thickness for the first case half 112 may be provided at a substrate junction 270 at which the interface portion 220 meets the first case half 112. In this regard, FIG. 6 shows a normal wall thickness (Tw) and a thickness of the substrate junction 270 (Tsj), and the difference therebetween is clear. In this example, the normal wall thickness (Tw) is about half (or is less than half) of the thickness of the substrate junction 270 (Tsj). The increased thickness of the substrate junction 270 provides a larger portion of overlap between the metallic case plate 200 and the first case half 112 to improve stability, but also increases the amount of interlocking material that may be achieved to solidify the rigidity of the connection between the first case hale 112 and the metallic case plate 200. Additionally, the substrate junction 270 provides additional substrate material that is disposed in a same plane as the metallic case plate 200 around a periphery of the interface portion 220 This additional substrate material grips the interface portion 220 to provide strong and effective binding of the metallic case plate 200 to its respective one of the first case half 112 or the second case half 114.

In this example, two instances of the metallic case plate 200 may be provided for insert-molding with the first case half 112, and two identical instances of the metallic case plate 200 may also be provided for insert-molding with the second case half 114. FIG. 7A shows a front view of the first case half 112 with two instances of the metallic case plate 200 coupled thereto after the insert-molding process is complete. FIG. 7B shows a rear view of the first case half 112 with the two instances of the metallic case plate 200 coupled thereto after the insert-molding process is complete. It should be understood that the same process may be completed for the second case half 114 (i.e., insert-molding with two more instances of the metallic case plate 200). Thereafter, the internal components of the measuring tape device 100 may be assembled and placed inside the first and second case halves 112 and 114, and the first and second case halves 112 and 114 may be joined together via providing the fasteners 210 through the fastener receptacles 260.

As can be appreciated from FIGS. 7A and 7B, the fact that two instances of the metallic case plate 200 are mated with the first case half 112 allows for a symmetrical structure to be produced. In other words, one of the two instances of the metallic case plate 200 is disposed on each opposite side of a line 300 bisecting the first case half 112. The same may be true of the second case half 114. This symmetry may be aesthetically pleasing, but may also have functional utility by providing effective closure of the two case halves. In this regard, as can be appreciated from FIGS. 7A and 7B, the two instances of the metallic case plates 200 extend across (and engage with) the first case half 112 over more than half the total length (excluding handle 180) and width of the first case half 112. Thus, when the fasteners 210 are employed, the fasteners apply an effective closure over the housing 100 while still making up a relatively small amount of the exposed surface area of the housing 100.

The fasteners 210 may include a screw and barrel nut combination, rivets, shoulder rivets, or any other suitable fastener hardware. Although some embodiments may rely only on the fasteners 210 to hold the first and second case halves 112 and 114 together, other embodiments may include additional more conventional fasteners (i.e., fasteners that engage the molded material directly) being applied in other locations. The other locations may include, for example, the handle 180 or at other parts of the housing 110. The use of the fasteners 210 holding the first and second case halves 112 and 114 together via the metallic case plates 200 greatly increases the strength and impact resistance of the measuring tape device 100, and reduce the threat of failure at any of the other, more conventional, fasteners.

FIG. 8 illustrates a block diagram of a method of assembling a measuring tape device in accordance with an example embodiment. The method may include insert-molding a first case half with a first metallic case plate at operation 420, insert-molding a second case half with a second metallic case plate at operation 430, providing a reel assembly on which tape is wound between the first and second case halves at operation 440, and joining the first and second case halves together by fastening the first metallic case plate to the second metallic case plate at operation 450. In some cases, the method may include initial operations including stamping the first metallic case plate to include a first interface portion and one or more first fastening receptacles at operation 400, and stamping the second metallic case plate to include a second interface portion and one or more second fastening receptacles at operation 410.

As can be appreciated from the descriptions above, employing the method, a robust measuring tape device can be produced via a relatively simple process that maximizes the employment of injection molding in relation to manufacturing the device. This enables low cost and improved manufacturability.

In an example embodiment, a tape measuring may be provided. The tape measuring device may include a housing having a first case half, a second case half, and an aperture. The device may also include a reel assembly disposed in the housing, a tape having a first end operably coupled to an end hook and configured to extend from the housing through the aperture and having a second end configured to be wound on the reel assembly, and a retraction assembly configured to interface with the reel assembly to enable the tape, after extension from the housing, to be wound onto the reel assembly. The first case half includes a first metallic case plate operably coupled thereto without a fastener, and the second case half includes a second metallic case plate operably coupled thereto without a fastener. The first and second case halves may be operably coupled together via one or more fasteners operably coupling the first metallic case plate to the second metallic case plate.

In some embodiments, the features of the device described above may be augmented or modified, or additional features may be added. These augmentations, modifications and additions may be optional and may be provided in any combination. Thus, although some example modifications, augmentations and additions are listed below, it should be appreciated that any of the modifications, augmentations and additions could be implemented individually or in combination with one or more, or even all of the other modifications, augmentations and additions that are listed. As such, for example, the first case half may be insert-molded with the first metallic case plate, and the second case half may be insert-molded with the second metallic case plate. In an example embodiment, the first and second metallic case plates may be stamped and include stamped features defining an interface portion, and the interface portion may interlock with a substrate junction at each of the first and second case halves. In some cases, a wall thickness of the housing at the substrate junction may be thicker than a wall thickness of other portions of the housing. In an example embodiment, the wall thickness of the housing at the substrate junction may be at least twice as thick as the wall thickness of the other portions of the housing. In some cases, the first and second metallic case plates may each include a first portion extending in a first direction and a second portion extending in a second direction. The first and second directions may have an angle defined therebetween. The first and second portions may each include a proximal edge and a distal edge, and the proximal edge may include teeth, fingers or protrusions configured to interface with material of the first and second case halves, respectively, responsive to insert-molding of the first and second metallic case plates with the first and second case halves, respectively. In an example embodiment, the first and second portions may each include a fastener receptacle disposed at distal longitudinal ends thereof, and the first and second case halves may be operably coupled together via metallic fasteners passed through corresponding ones of the fastener receptacles operably coupling the first metallic case plate to the second metallic case plate. In some cases, the angle may be between about 90 degrees and 160 degrees. In an example embodiment, the first case half may include at least two instances of the first metallic case plate disposed on opposite sides of a line bisecting the first case half, and the second case half may include at least two instances of the second metallic case plate disposed on opposite sides of a line bisecting the second case half. In some cases, the at least two instances of the first metallic cases plate, and the at least two instances of the second metallic case plate combine to extend across more than half of a total length and total width of the housing. In some cases, the substrate junction may include additional substrate material disposed in a same plane as the first or second metallic case plate around a periphery of the interface portion. In an example embodiment, the additional substrate material grips the interface portion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A tape measuring device comprising:
a housing comprising a first case half and a second case half, the housing further including an aperture;
a reel assembly disposed in the housing;
a tape having a first end operably coupled to an end hook and configured to extend from the housing through the aperture and having a second end configured to be wound on the reel assembly; and
a retraction assembly configured to interface with the reel assembly to enable the tape, after extension from the housing to be wound onto the reel assembly,
wherein the first case half comprises a first metallic case plate operably coupled thereto without a fastener, and the second case half comprises a second metallic case plate operably coupled thereto without a fastener, and wherein the first and second case halves are operably coupled together via one or more fasteners operably coupling the first metallic case plate to the second metallic case plate, wherein the first and second metallic case plates are stamped and include stamped features defining an interface portion, wherein the interface portion interlocks with a substrate junction at each of the first and second case halves.

2. The tape measuring device of claim 1, wherein a wall thickness of the housing at the substrate junction is thicker than a wall thickness of other portions of the housing.

3. The tape measuring device of claim 2, wherein the wall thickness of the housing at the substrate junction is at least twice as thick as the wall thickness of the other portions of the housing.

4. The tape measuring device of claim 1, wherein the substrate junction includes additional substrate material disposed in a same plane as the first or second metallic case plate around a periphery of the interface portion.

5. The tape measuring device of claim 4, wherein the additional substrate material grips the interface portion.

6. The tape measuring device of claim 4, wherein the interface portion comprises projections that extend into the additional substrate material.

7. The tape measuring device of claim 4, wherein the interface portion comprises a plurality of teeth or fingers that extend into the additional substrate material.

8. A tape measuring device comprising:
a housing comprising a first case half and a second case half, the housing further including an aperture;
a reel assembly disposed in the housing;
a tape having a first end operably coupled to an end hook and configured to extend from the housing through the aperture and having a second end configured to be wound on the reel assembly; and
a retraction assembly configured to interface with the reel assembly to enable the tape, after extension from the housing to be wound onto the reel assembly,
wherein the first case half comprises a first metallic case plate operably coupled thereto without a fastener, and the second case half comprises a second metallic case plate operably coupled thereto without a fastener, and
wherein the first and second case halves are operably coupled together via one or more fasteners operably coupling the first metallic case plate to the second metallic case plate, wherein the first and second metallic case plates each include a first portion extending in a first direction and a second portion extending in a second direction, the first and second directions having an angle defined therebetween,
wherein the first and second portions each include a proximal edge and a distal edge, and
wherein the proximal edge comprises teeth, fingers or protrusions configured to interface with material of the first and second case halves, respectively, responsive to insert-molding of the first and second metallic case plates with the first and second case halves, respectively.

9. The tape measuring device of claim 8, wherein first and second portions each include a fastener receptacle disposed at distal longitudinal ends thereof, and
wherein the first and second case halves are operably coupled together via metallic fasteners passed through corresponding ones of the fastener receptacles operably coupling the first metallic case plate to the second metallic case plate.

10. The tape measuring device of claim 9, wherein the angle is between about 90 degrees and 160 degrees.

11. A tape measuring device comprising:
a housing comprising a first case half and a second case half, the housing further including an aperture;
a reel assembly disposed in the housing;
a tape having a first end operably coupled to an end hook and configured to extend from the housing through the aperture and having a second end configured to be wound on the reel assembly; and
a retraction assembly configured to interface with the reel assembly to enable the tape, after extension from the housing to be wound onto the reel assembly,
wherein the first case half comprises a first metallic case plate operably coupled thereto without a fastener, and the second case half comprises a second metallic case plate operably coupled thereto without a fastener, and
wherein the first and second case halves are operably coupled together via one or more fasteners operably coupling the first metallic case plate to the second metallic case plate, wherein the first case half comprises at least two instances of the first metallic case plate disposed on opposite sides of a line bisecting the first case half, and
wherein the second case half comprises at least two instances of the second metallic case plate disposed on opposite sides of a line bisecting the second case half.

12. The tape measuring device of claim 11, wherein the at least two instances of the first metallic cases plate, and the at least two instances of the second metallic case plate combine to extend across more than half of a total length and total width of the housing.

13. A method of making a tape measuring device, the method comprising:
stamping a first metallic case plate to include a first interface portion and one or more first fastening receptacles;
stamping a second metallic case plate to include a second interface portion and one or more second fastening receptacles
insert-molding a first case half with the first metallic case plate;
insert-molding a second case half with the second metallic case plate;
providing a reel assembly on which tape is wound between the first and second case halves; and
joining the first and second case halves together by fastening the first metallic case plate to the second metallic case plate,
wherein insert-molding the first case half with the first metallic case plate comprises interlocking material of the first case half with the first interface portion, and
wherein insert-molding the second case half with the second metallic case plate comprises interlocking material of the second case half with the second interface portion.

14. The method of claim 13, wherein joining the first and second case halves together comprises aligning the one or more first fastening receptacles with the one or more second fastening receptacles, and applying a corresponding one or more metallic fasteners to the aligned one or more first and second fastening receptacles.

* * * * *